United States Patent [19]

Sainte-Beuve

[11] 3,773,971

[45] Nov. 20, 1973

[54] ARRANGEMENT FOR DIGITAL ENCODING OF COLOUR TELEVISION VIDEO SIGNALS

[75] Inventor: Philippe Sainte-Beuve, Paris, France

[73] Assignee: U.S. Philips Corporation, New York, N.Y.

[22] Filed: Apr. 1, 1971

[21] Appl. No.: 130,189

[30] Foreign Application Priority Data

Apr. 2, 1970 France .............................. 7011878

[52] U.S. Cl. .......................... 178/5.4 R, 179/15 BA

[51] Int. Cl. ............................................ H04n 9/02

[58] Field of Search ................ 178/5.1, 5.4, DIG. 3; 179/15 BA, 15 BW, 15.55 R

[56] References Cited

UNITED STATES PATENTS

| | | | |
|---|---|---|---|
| 3,270,321 | 8/1966 | Berkowitz | 179/15 BA |
| 3,447,147 | 5/1969 | Deregnaucourt | 179/15 BA |
| 3,435,134 | 3/1969 | Richards | 179/15.55 R |

*Primary Examiner*—Richard Murray
*Attorney*—Frank R. Trifari

[57] ABSTRACT

An arrangement for digital encoding of a colour television video signal for transmission by delta-modulation, in which the choice of the sampling for quantising and coding an transmission of information depends upon the magnitude of the variations of the moment of the brightness signal and of the colour signal and upon the variations appearing during the next samplings.

The method is used for retransmission of the signals E'Y, D'B and D'R of the SECAM system from a communication satellite.

9 Claims, 4 Drawing Figures

| SIGNAL | LEVEL REPRE-SENT-ATION | CORRESPOND-ING CODE WORD | QUANTIFIER OUTPUTS AND CORRESPONDING VOLTAGES | | | | | | | | | | | | | |
|---|---|---|---|---|---|---|---|---|---|---|---|---|---|---|---|---|
| | | | D1 | D 2 | D 3 | D 4 | D'5 | D'6 | D'7 | D'8 | D 9 | D10 | D 11 | D'12 | D'13 | D'14 |
| LUMINANCE | + 60 | C C A | 1 | 1 | 1 | 1 | 0 | 0 | 0 | 0 | 0 | 0 | 0 | 0 | 0 | 0 |
| | + 24 | D A | 1 | 1 | 1 | 0 | 0 | 0 | 0 | 0 | 0 | 0 | 0 | 0 | 0 | 0 |
| | + 8 | C A | 1 | 1 | 0 | 0 | 0 | 0 | 0 | 0 | 0 | 0 | 0 | 0 | 0 | 0 |
| | + 2 | A | 1 | 0 | 0 | 0 | 0 | 0 | 0 | 0 | 0 | 0 | 0 | 0 | 0 | 0 |
| | - 2 | B | 0 | 0 | 0 | 0 | 1 | 0 | 0 | 0 | 0 | 0 | 0 | 0 | 0 | 0 |
| | - 8 | C B | 0 | 0 | 0 | 0 | 1 | 1 | 0 | 0 | 0 | 0 | 0 | 0 | 0 | 0 |
| | - 24 | D B | 0 | 0 | 0 | 0 | 1 | 1 | 1 | 0 | 0 | 0 | 0 | 0 | 0 | 0 |
| | - 60 | C C B | 0 | 0 | 0 | 0 | 1 | 1 | 1 | 1 | 0 | 0 | 0 | 0 | 0 | 0 |
| CHROMINANCE | + 50 | D D A | 0 | 0 | 0 | 0 | 0 | 0 | 0 | 0 | 1 | 1 | 1 | 0 | 0 | 0 |
| | + 15 | D C A | 0 | 0 | 0 | 0 | 0 | 0 | 0 | 0 | 1 | 1 | 0 | 0 | 0 | 0 |
| | + 2 | C D A | 0 | 0 | 0 | 0 | 0 | 0 | 0 | 0 | 1 | 0 | 0 | 0 | 0 | 0 |
| | - 2 | C D B | 0 | 0 | 0 | 0 | 0 | 0 | 0 | 0 | 0 | 0 | 0 | 1 | 0 | 0 |
| | - 15 | D C B | 0 | 0 | 0 | 0 | 0 | 0 | 0 | 0 | 0 | 0 | 0 | 1 | 1 | 0 |
| | - 50 | D D B | 0 | 0 | 0 | 0 | 0 | 0 | 0 | 0 | 0 | 0 | 0 | 1 | 1 | 1 |

Fig. 4

ARRANGEMENT FOR DIGITAL ENCODING OF COLOUR TELEVISION VIDEO SIGNALS

This invention relates to an arrangement for digital encoding particularly but not exclusively the brightness signals and colour signals of colour television pictures for transmission in a frequency band of moderate width in the form of a rapid succession of short signals, each having a given, elementary significance said succession being grouped in "words" of variable length by the application of pulse delta-modulation.

It is known that the basic principle of delta-modulation signal transmission consists in transmitting solely the intensity variations of the signal instead of transmitting at any instant an electric magnitude representing in analogue form the required information. The variations to be transmitted result from the comparison of signal magnitudes at two different instants lying very near each other and corresponding to two consecutive signal samples.

In order to avoid the cumulative errors which might result from a transmission disturbed by background noise of the successive variations of the signals to be transmitted, the corresponding information is usually transmitted in coded pulse form, which transmission mode provides the best immunity to disturbances likely to be introduced by a given level of background noise.

This immunity to background noise is, however, opposed by the fact that delta pulse-code-modulation transmission in order to maintain a satisfactory picture definition requires a much wider frequency band, than the frequency band required by the direct transmission of the signals in analogue form; this is a disadvantage especially so if the signal to be transmitted is a wide band signal, such as a television video signal.

Among the variants various arrangements for the transmission of information in the form of a difference signal there is disclosed in French Pat. specification No. 1,041,766 an arrangement in which the amplitude variations of a signal are transmitted in the form of successive information signals, each of which corresponds to a variation quantum selected among a given number of predetermined variation levels, each one of these levels being represented for information transmission by a suitable group of coded pulses.

The quality and the fidelity of a signal transmitted with the aid of different signals and of pulse code transmission depend upon the number of quantised levels such that the use of a greater number of levels representative of the variations to be transmitted provides an improved transmission but leads to a code of longer words requiring a higher total number of pulses and a larger bandwidth for the transmission.

A method providing an appreciable improvement in the quality of the pictures obtained, while a comparatively small number of representative levels is used, is disclosed in applicant's French Pat. application filed the 31st of Dec., 1969 registered under No. 6945677. Said method allows an appreciable reduction of the frequency band required for the transmission, but the use of this method alone does not permit reducing the bandwidth required for the transmission of brightness and colour information contained in a colour television video signal to an extent as required for said transmission to be possible in a standard 8 MHz channel.

The invention has for its object to reduce the frequency band occupied by the brightness and colour information of a colour television video signal with a basic interval between samplings of 100 nsec and coded transmission of information in accordance with the "quadriphase" transmission method, in a sequential system such as the SECAM system, to some 10 MHz with a picture of 625 lines and 50 frame periods a second, while an accurate time transmission of the most important transitions of brightness and chrominance is maintained.

The invention is based on the recognition of the fact that the correct reproduction of a picture depends largely upon the transmission of the important variations of the brightness signal at instants as accurate as possible and that the regular sampling being random with respect to the signal it is very likely to detract from the correct reproduction of the important transitions at the receiver end.

According to the invention the method of digital encoding of a video signal, particularly but not exclusively of colour television pictures, is mainly characterized in that with simultaneous sampling for information and quantisation of the instantaneous value of the brightness signal to be transmitted and the values it will have in 1 to *n* time steps or sampling, the choice of sampling in favour of quantisation and coding is made in accordance with the values of the variations determined and with the times required for the transmission of corresponding code words and in that information transmission priority is given to either that brightness signal or that colour signal whose variation is proportionally the most important at the instant of carrying out a given set of simultaneous samplings.

In order to ensure that the transmission of code signals corresponding to the most important variations of the image contents are carried out at the optimum instants, the transmission of a small or mean variation (corresponding, for example, to a code word of two digits) preceding a transition of high amplitude is replaced by the transmission of a very small variation (code word on one digit) so that at the most suitable instant a word of three digits can be transmitted and in this way an accurate reproduction of the contours in brightness and in position is ensured.

The instants of information sampling remain evenly distributed in time and provide to the circuitry the necessary indications for the quantisation, coding and transmission samplings to be carried out at the most appropriate instants, while the transmission of a very small variation (code word of one digit) may be considered as that of a waiting signal preceding the coding and the transmission of a much more important variation.

In order to ensure optimum coincidence between the end of the transmission of the corresponding code word and the scanning of the place of the transition in line scan, the sampling of a great transition (code word of three digits) for quantisation and coding is advanced by a time unit relatively to the sampling for coding a mean or small transition (code word of two digits).

The transmission of a very small variation by a code word of one digit is finally advanced by a time unit relatively to the transmission of a small, mean or large variation without the structure of the image at the receiver end being perceptibly affected thereby.

The arrangement according to the invention permits utilising to the optimum the frequency band occupied by high-frequency signals to be transmitted , the phase of said signals indicating the elementary information of each of them, which information may be represented in a conventional code by an arabic digit (intrinsic meaning of the term digit in data processing) or by a code letter (extended meaning of the term digit).

It is known that in a normal image the information of brightness variations to be transmitted, for example, is not likely to have the same probability factor and that with a number of samples of about 500 on one line roughly 50 percent of transitions between samples represents less than 3 percent of the total scale from black to white and that less than 1 percent of the transitions corresponds to a variation of more than 30 percent.

While it leads to the use of a frequency band of moderate width, the method according to the invention permits, for example, the transmission of numerous small variations expressed by a digit, which indicates at the same time that the "word" has only one digit, the transmission of mean variations of two different representative levels, which are considerably less numerous and expressed by words of two digits and the transmission of a few variations of great amplitude expressed by words of three digits.

The simultaneous samplings of the actual value and the successive values of the sampled signal permit knowing in advance the great variations to be transmitted and, while inhibiting the transmission of preceding small variations, permit beginning at the desired time the transmission of words of three digits representing the same in a logical transmission code. The colour information, which provides the colouring of the image in compatible television systems and which does not directly affect the fineness of the definition, lies in a comparatively narrow pass band as compared with the brightness signal and does not require a very high transmission rate: when this transmission is performed at the instants when the colour signal variations are larger than the brightness signal variations at all instants when the transmission of the brightness signal has a comparatively doubtful efficiency the very principle of delta-modulation is utilised as best as possible so that what is not transmitted subsequent to a sampling leads to an "overtake" during the next sampling. The lower transmission rate of colour information permits using code words of three digits which is otherwise required for distinguishing them from brightness information.

The following description with reference to a practical embodiment of the encoding arrangement in accordance with the invention will be given with reference to the accompanying drawings by way of non-limitating example and will show how the invention may be carried into effect.

FIG. 4 is a table indicating the distribution of the voltages and the absence of voltages at the output connected to a coding stage (not shown) of the quantising circuit for the variations of the brightness signals and the chrominance signals.

Figure 1:
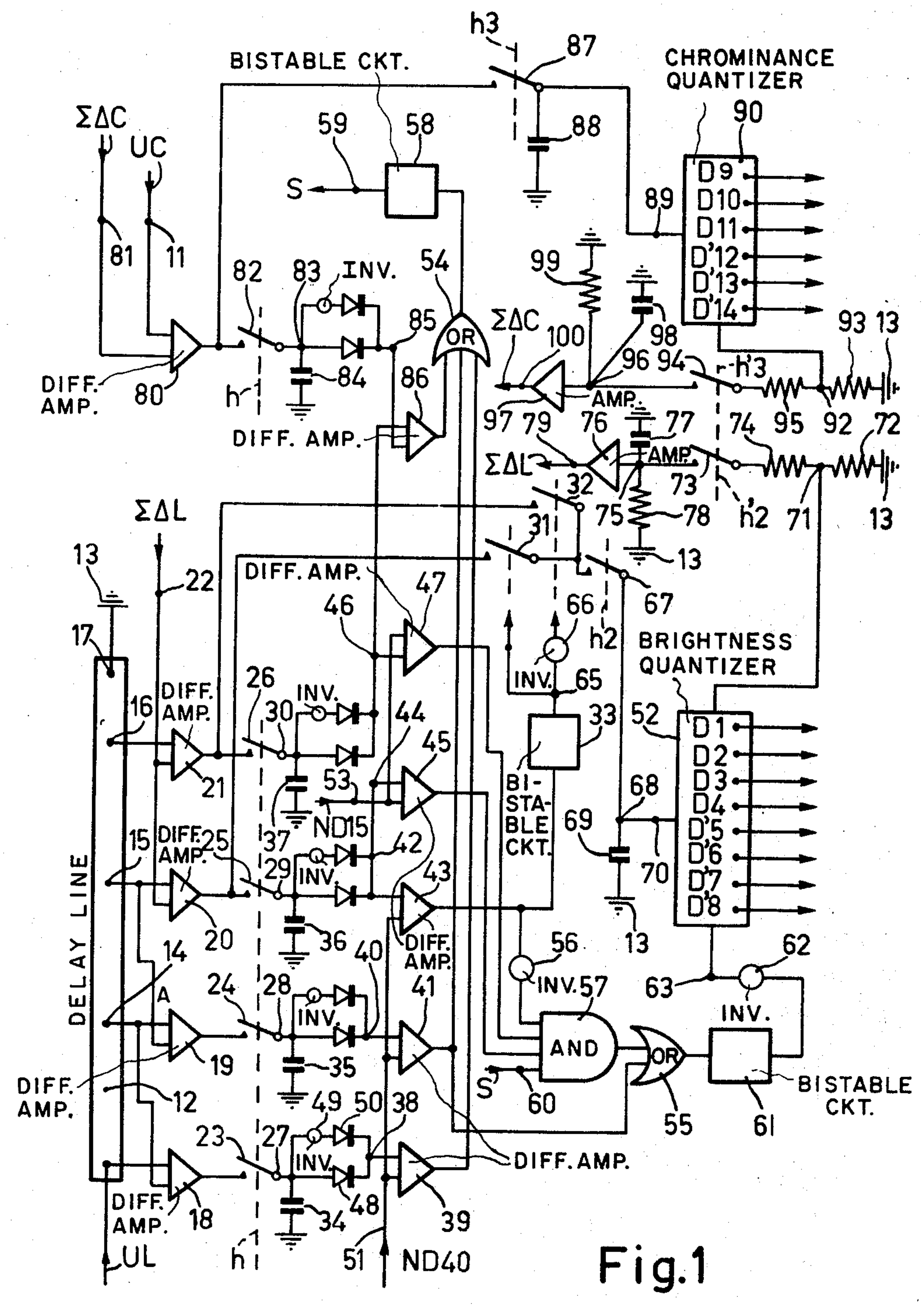
FIG. 1 is a block diagram of an embodiment of a circuit arrangement for carrying out the method according to the invention for processing a television video signal.

The embodiment of the method according to the invention is based for information transmission on code words of variable length having one to three digits and on a quadriphase transmission system in which four different symbols can be employed, which will be represented hereinafter in a conventional manner by the capital letters A, B, C and D.

When using words of variable length, the receiving arrangement has to receive information about the end of each transmitted word by a defined code; in the example under consideration the end of a word corresponds to the use of a digit A or a digit B. Taking this inhibiting mechanism into consideration, it is possible to use fourteen different combinations having one to three digits and terminating by a digit A or a digit B indicating the end of each word.

The fact of having in total 14 different combinations available permits, for example, allocating eight combinations having one to three digits to the transmission of the brightness signal variations and six combinations of three digits to the transmission of the chrominance signal variations, it being assumed that in accordance with the invention the instantaneous variation of the chrominance signal is one of the colour burst signals D'B and D'R used in the SECAM system.

It is thus possible to use for the brightness signal three decision levels ND and four representative levels NR and for the chrominance signal two decision levels and three representative levels. By way of non-limiting example, the decision levels for the brightness signal may be 5 percent, 15 percent and 40 percent and the representative levels may be 2 percent, 8 percent, 24 percent and 60 percent; for the chrominance signal the decision levels may be 9 percent and 30 percent and the representative levels may be 2 percent, 15 percent and 50 percent. All these figures are given only for purpose of illustration.

The words of one digit may be related to the transmission of very small variations; the words of two digits may be related to the transmission of small and mean variations and two words of three digits may be related to the transmission of large variations of the brightness signal, whilst six further words of three digits are employed for the transmission of chrominance information.

A non-limiting example of the distribution of the code words in accordance with the variations to be transmitted of the brightness signals and the chrominance signals is given in the following Table.

LUMINANCE

| Decision level low | Decision level high | Repres. levels | Code words |
|---|---|---|---|
| 40 % | | + 60 % | C C A |
| 15 % | 40 % | + 24 % | D A |
| 5 % | 15 % | + 8 % | C A |
| 0 % | 5 % | + 2 % | A |
| 0 % | − 5 % | − 2 % | B |
| − 5 % | −15 % | − 8 % | C B |
| −15 % | −40 % | − 24 % | D B |
| −40 % | | − 60 % | C C B |

| | | | | | | |
|---|---|---|---|---|---|---|
| CHROMINANCE | 30 % | | + 50 % | D | D | A |
| | 9 % | 30 % | + 15 % | D | C | A |
| | 0 % | 9 % | + 2 % | C | D | A |
| | 0 % | − 9 % | − 2 % | C | D | B |
| | − 9 % | −30 % | − 15 % | D | C | B |
| | −30 % | | − 50 % | D | D | B |

Figure 2:
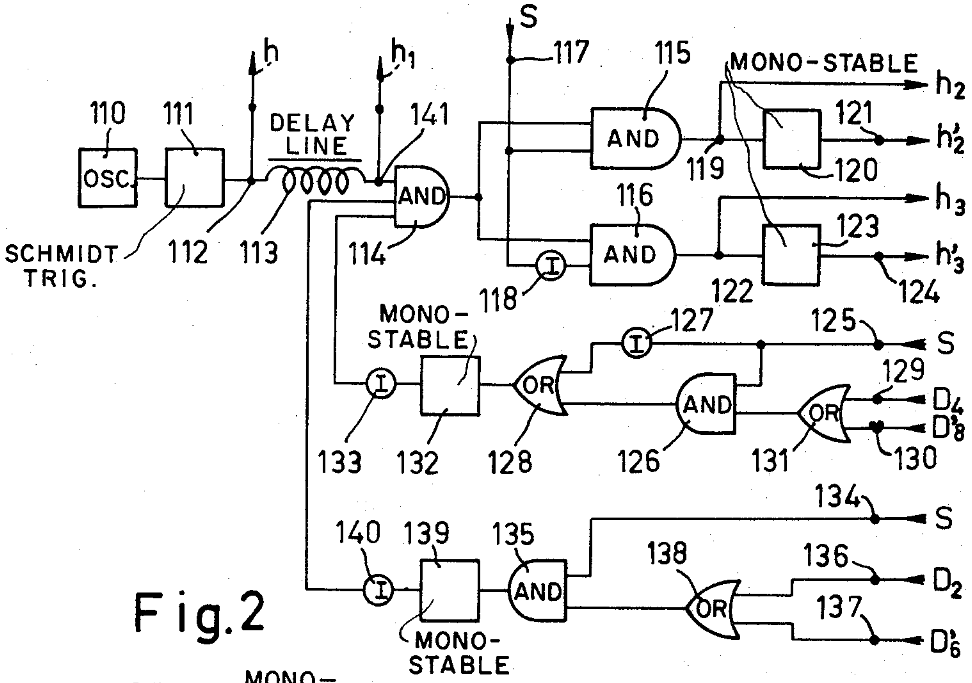
FIG. 2 is a block diagram of an arrangement cooperating with the arrangement shown in FIG. 1, for the supply of systematic and random clock pulses required for the operation of the various switching means comprises therein.

A suitable number of simultaneous samplings (in this case four) is carried out at successive tappings of a delay line so that the variations at the normal samplings at the instant $t$ and the magnitudes of the next samplings at the instants $t + \tau, t + 2\tau$, and $t + 3\tau$, are known such that the circuitry shown in FIGS. 1 and 2 may start the inhibition operations intended for allowing the transmission of larger variations at the desired instant than the variations being transmitted at that instant. For example, the transmission of a word of two digits, corresponding to a representative level of 8 percent, may be cut and brought to the transmission of a representative level of 2 percent, if a variation exceeding 15 percent requiring the transmission of a representative level of 24 percent is to be foreseen for the next sampling. In a similar manner the transmission of a variation involving the use of a representative level of 60 percent having priority relative to the transmission of a representative level of 24 percent gives rise, when the appearance of a signal variation involving the transmission of a representative level of 60 percent is assessed by the circuitry at the level of the first tapping of the delay line, to the replacement of a code word of two digits by a code word of one digit.

A similar mechanism of priority in transmission operates in favour of a variation between 15 percent and 40 percent over a variation between 5 percent and 15 percent preceding the former by an elementary time interval of sampling: instead of the representative level of 8 percent, when using a code word of two digits, it is the representative level of 2 percent, corresponding to a code word of one digit, which is coded and transmitted for the subsequent immediate coding of the variation requiring a representative level of 24 percent.

The circuits shown in FIGS. 1 and 2 to be described hereinafter serve for carrying out all operations required for the signals to be transmitted.

The arrangement shown in FIG. 1 comprises an input terminal 10, to which the brightness signal UL is applied, and a terminal 11, to which the chrominance signal UC is applied. The terminal 10 forms part of a delay line 12, terminating at the grounded point 13 and having tappings 14, 15, 16 and a terminal 17 connected to ground at 13. The delay line 12 may be formed, for example, by a coil evenly distributed on an insulating body and having a given distributed capacitance. The time required for a brightness signal at terminal 10 to travel towards tapping 14 is equal to the theoretical unit time interval between two elementary samplings; this also applies for the tappings 14 and 15 and the tappings 15 and 16 respectively. If the unit time interval is designated by $\tau$, the signal at the terminal 15 at an instant $t$ corresponds to that available at the terminal 16 at the instant $t + \tau$; the signals available at the terminals 14 and 10 at the instant $t$ correspond to those available at the terminal 16 at the instants $t + 2\tau$ and $t + 3\tau$. The input terminal 10 and the tappings 14, 15 and 16 of the delay line 12 are directly connected to a first higher input or signal input of difference amplifiers 18, 19, 20 and 21 respectively. The difference amplifiers 18, 19, 20 and 21 are each provided with a lower input or reference input connected to a reference voltage source. The reference voltage inputs of the difference amplifiers 20 and 21 are connected to a terminal 22, to which the sum ΣDL of the previously transmitted variations after quantisation and by coding of the brightness signal is applied. The reference input of the difference amplifier 19 is connected to the tapping 15 and the reference input of the difference amplifier 18 is connected to tapping 14. The outputs of the difference amplifiers 18, 19, 20 and 21 are connected each to an input of a high-speed switch 23, 24, 25 and 26 respectively associated with a set of four high-rate switches controlled in synchronism by a clock signal $h$. The switches 23, 24, 25 and 26 perform, during each short time of closure, information samplings of the brightness signal variations. The outputs of these four switches correspond to 27, 28, 29 and 30 respectively. The outputs of the difference amplifiers 20 and 21 are furthermore connected to the inputs of two high-speed switches 31 and 32, controlled by the pulses supplied by bistable circuit 33, said switches carrying out quantisation and coding samplings. The switches 27, 28, 29, 30, 31 and 32 may be formed by field-effect transistors and bistable circuit 33 may be formed by a Schmitt trigger. Between the outputs 27, 28, 29, 30 of the switches 23, 24, 25, 26 respectively and the ground point 13 are disposed fixed capacitors 34, 35, 36 and 37 respectively, which store the sampled signal between two consecutive samplings. A linking cell, the structure of which will be described more fully hereinafter, is arranged between the output 27 and a signal input 38 of a difference amplifier 39; a linking cell of identical structure is connected between the output 28 and a signal input 40 of a difference amplifier 41; an identical linking cell is disposed between the output 29 and a signal input 42 of a difference amplifier 43; the input for the signal 42 is otherwise directly connected to a signal input 44 of a difference amplifier 45; an identical linking cell is arranged between the output 30 and a reference input 46 of a difference amplifier 47.

The linking cell between the point 27 and the point 38 is formed by two parallel connected branches: one of them includes a semiconductor diode 48, the anode of which is connected to point 27 and the cathode of which is connected to point 38; the second branch is formed by a signal polarity inverter 49, the input of which is connected to point 27 and the output of which is connected to the anode of a diode 50, the cathode of which is connected to point 38. The reference inputs of the difference amplifiers 39, 41 and 43 are connected to a point 51, to which the corresponding voltages of the levels ND40 of the quantising circuit for the brightness signal variations 52 are applied. A reference input of the amplifier 45 and a signal input of the difference amplifier 47 are directly connected to a point 53, to which the voltage corresponding to the decision level ND15 of the quantising circuit 52 is applied.

The output of the difference amplifier 39 is connected to one of the inputs of an or-gate 54 having three inputs; the output of the difference amplifier 41 is connected to a second input of the or-gate 54 and to one of the inputs of an or-gate 55 having two inputs. The output of the difference amplifier 43 is connected to the input of the bistable circuit 33 and via a polarity inverter 56 to one of the inputs of an and-gate 57 having four inputs. The outputs of the difference amplifiers 45 and 47 are each connected to one of the inputs of the and-gate 57. The output of the or-gate 54 is connected to the input of a bistable circuit 58, at the output 59 of which appears a signal S equal to L, when the brightness signal variation exceeds the chrominance signal variation; the bistable circuit 58 may be formed by a Schmitt trigger. The fourth input 60 of the and-gate 57 is connected by a lead (not shown) to the output 59 of the bistable circuit 58. The output of the and-gate 57 is connected to the second input of the or-gate 55, the output of which is connected to the input of a bistable circuit 61, the output of which is connected to the input of an inverter 62, the output of which (63) is connected to the brightness signal quantising circuit 52. The quantising circuit 52 is provided with eight outputs connected to a coding circuit (not shown) D1, D2, D3, D4, D'5, D'6, D'7 and D'8. The outputs D1, D2, D3, D4 are direct outputs corresponding to the coding of the positive variations Δ1 of the brightness signal; the outputs D'5, D'6, D'7 and D'8 are complementary outputs corresponding to the appearance of an output voltage of the same polarity as that appearing at the outputs D1, D2, D3 and D4 during negative variations of the brightness signal. When a signal 1 appears at the output of the bistable circuit 61, giving rise to the appearance of the signal Q at terminal 63, the outputs D2, D3, D4, D'6, D'7, D'8 of the quantising circuit 52 are brought to zero by the presence of the signal "0" at terminal 63.

The high-rate switch 31 is directly controlled by the pulses appearing at the output 65 of the bistable circuit 33; the output terminal 65 is furthermore connected to the input of an inverter 66, the output of which controls the switch 32; the switch 32 is thus closed when the switch 31 is open and conversely. The outputs of the switches 31 and 32 are connected to each other and to the input of a further high-rate switch 67, controlled by a clock signal h2 emanating from the output of an and-gate 115, designated by 119 in FIG. 2. The output of the switch 67 is connected to a point 68 corresponding to the first electrode of a capacitor 69, the second electrode of which is connected to ground (13) and to the input terminal 70 of the brightness signal quantising circuit 52.

As far as the coding conditions for the brightness signal variations allow, the high-speed switch 67 transfers to the input terminal 70 of the quantising circuit 52 quantisation and coding samplings either by the switch 32 or by the switch 31.

Apart from its connection to the coding circuit (not shown), the quantising circuit 52 has an output terminal 71 connected to a low value resistor 72, the other end of which is connected to ground at 13. The input of a high-speed switch 73 is connected to terminal 71 via a resistor 74. The output of the switch 73 is connected to a point 75, which forms the input of an amplifier 76 having a high input impedance and a low output impedance. The capacitor 77 and a resistor of comparatively high value 78 are connected between point 75 and ground at 13. The electric voltages appearing between point 71 and ground at 13 correspond in magnitude and polarity to the information provided by the quantising circuit 52 to the coding circuit (not shown) and the significance of the instructions transferred by the said coder to the modulation circuit (not shown either). At the instant when the switch 73 is closed, the capacitor 77 and the resistor 74 form an integrating network and from the output 79 of the amplifier 76 a signal is derived which corresponds to the sum ΣΔL of the brightness signal variations as coded and transmitted. Terminal 79 is connected to terminal 22 via a lead (not shown).

The terminal 11, to which the chrominance signal UC is applied, is connected to the signal input of the difference amplifier 80 having a reference input 81, to which is applied the sum ΣΔC of the previously transmitted variations after quantisation and by coding of the brightness signal. The output of the difference amplifier 80 is connected to the input of a high-speed switch 82 controlled, like the switches 23, 24, 25 and 26, by the clock signal $h$ and to the input of a high-speed switch 87, controlled by a clock signal h3 supplied from the output of an and-gate 116, designated by 122 in FIG. 2. The switch 82 carries out the information samplings of the variations of the chrominance signal and the switch 87 carries out the quantising and coding samplings.

The output of the high-speed switch 82 is connected to a point 83, to which is connected the upper electrode of a capacitor 84, the lower electrode of which is connected to ground at 13. The point 83 is connected to the reference input 85 of the difference amplifier 86 via a linking cell identical to that formed by the diode 48, the polarity inverter 49 and the diode 50. The signal input of the difference amplifier 86 is connected to the reference input of the difference amplifier 47. A voltage divider may be connected to one of the two signal inputs or reference inputs of the difference amplifier 86 so that a weight coefficient $k$ is introduced into the comparison of the absolute values of the variations of the brightness and chrominance signals. The output of the difference amplifier 86 is connected to the third input of the or-gate 54.

A capacitor 88 is connected between the output of the high-speed switch 87 and ground 13 and said output is otherwise connected to the input 89 of a circuit 90 for carrying out the quantisation of the chrominance signal variations. The quantising circuit 90 is provided with six outputs connected to the coding arrangement (not shown) D9, D10, D11, D'12, D'13, D'14. The outputs D9, D10 and D11 are direct outputs corresponding to coding of the variations ΔC positive of the chrominance signal; the outputs D'12, D'13, D'14 are complementary outputs corresponding to the appearance of an output voltage of the same polarity as that of the voltage appearing at the outputs D9, D10 and D11, during the negative variations of the chrominance signal to be transmitted.

Apart from its connections to the coding circuit (not shown) the quantising circuit 90 comprises an output terminal 92, to which is connected a resistor 93 of low value, the other end of which is grounded at 13. The input of a high-speed switch 94 is connected to the terminal 92 via a resistor 95. The output of the high-speed switch 94 is connected to a point 96, which forms the input of an amplifier 97 having a high input impedance and a low output impedance. The capacitor 98 and the resistor 99 of comparatively high value are connected between the point 96 and ground at 13. The electric voltage appearing between the point 92 and ground at 13 corresponds in magnitude and polarity to the information provided by the quantising circuit 90 to the coder shown and to the significance of the instructions transferred by said coder to the modulation stage (not shown). At the instants when the switch 94 is closed, the capacitor 98 and the resistor 95 form an integrating network and the output terminal 100 of the amplifier 97 provides a signal corresponding to the sum $\Sigma\Delta C$ of the variations of the chrominance signal as they are coded and transmitted. The terminal 100 is connected to the terminal 81 via a lead (not shown).

The leakage resistors 78 and 99 of the integrating circuits of the coded variations of brightness and chrominance signals could be replaced by high-speed switches for resetting to zero at the end of each line; the switches could, for example, be controlled by the signal h4.

The arrangement shown in FIG. 2 comprises an oscillator 110 operating at the fundamental frequency of the samplings. The fundamental frequency may advantageously be chosen of the order of 10 to 12 MHz and may correspond to a multiple of the repetition frequency of the line scan. When the repetition frequency of the line scan amounts to 15,625 per second (625 lines), the fundamental frequency of the oscillator may be about 10.12 MHz or about 11.39 MHz so that the fundamental frequency of the oscillator may be related to the frequency of the line scan via a succession of frequency dividing stages, each of which performs a division by two or three. Thus $10{,}125{,}000 = 15{,}625 \times 2^3 \times 3^4$ and $11{,}390{,}625 = 15{,}625 \times 3^6$. The choice of such a frequency permits, by using a phase comparator and a control circuit for the fundamental frequency of the oscillator, of ensuring a stable operation of the sampling circuits in connection with the line scan.

The output of the oscillator 110 is connected to the input of a pulse forming circuit 111 supplying rectangular or square-wave pulses, which circuit may be formed by a Schmitt trigger. The clock signal *h*, which controls, for example, the high-speed switches 23, 24, 25, 26 and 82 of FIG. 1, is derived from the output 112 of the pulse former 111. The output 112 of the circuit 111 is connected to one of the three inputs 141 of an and-gate 114 via a small delay line 113, which introduces a slight delay of the order of 20 nsec, for example, for the propagation of the signals from the output 112. The clock signal, which is slightly delayed and which is available at point 141, is termed the signal h1. The output of the and-gate 114 is connected to one of the inputs of the two and-gates 115 and 116 having two inputs. The circuit comprises a terminal 117 connected to terminal 59 of the bistable circuit 58 of FIG. 1, at which appears the signal S. The terminal 117 is directly connected to the second input of the and-gate 115 and via a polarity inverter 118 to the second input of the and-gate 116. The clock signal h2, controlling the switch 73 of FIG. 1, is available at the output 119 of the and-gate 115. The output 119 is connected to the input of a monostable circuit 120 comprising an output 121, at which appears the clock signal h'2, controlling the switch 73. The signal h'2 is slightly delayed with respect to the signal h2 by the operation of the monostable circuit 120 and its duration may be substantially equal to or slightly shorter than that of the signal h2. The and-gate 116 is provided with an output 122, from which the clock signal h3 can be derived, which controls the switch 87 of FIG. 1. The output 122 is connected to the input of a monostable circuit 123, having an output 124, at which appears the clock signal h'3, controlling the high-speed switch 94. The signal h'3 is slightly delayed relatively to the signal h3 by the operation of the monostable circuit 123 and its duration may be substantially equal to or slightly shorter than that of the signal h3.

The arrangement shown comprises furthermore information inputs 125, 129, 130, 134, 136 and 137. The two terminals 125 and 134 are connected to the terminal 59 of FIG. 1, where appears the signal S, via leads (not shown). The terminals 129, 130, 136 and 137 are connected to the outputs D7, D'8, D2 and D'6 of the brightness signal quantising circuit 52. The terminal 125 is directly connected to one of the inputs of an and-gate 126 having two inputs and via a polarity inverter 127 to one of the two inputs of an or-gate 128. The two terminals 129 and 130 are connected to the two inputs of an or-gate 131, the output of which is connected to the second input of the and-gate 126. The output of the and-gate 126 is connected to the second input of the or-gate 128 and the output of said or-gate 128 is connected to the input of a monostable circuit 132,which supplies at its output, in operation, a pulse the duration of which is equal to or slightly longer than $2\tau$. The output of the monostable circuit 132 is connected to one of the three inputs of the and-gate 114 via a polarity inverter 133. The terminal 134 is connected to one of the two inputs of an and-gate 135. The two terminals 136 and 137 are connected to the two inputs of an or-gate 138 having two inputs and the output of said gate is connected to the second input of the and-gate 135. The output of the gate 135 is connected to the input of a monostable circuit 139, which supplies at its output, in operation, a pulse, the duration of which is equal to or slightly longer than $\tau$. The output of the monostable circuit 139 is connected to the third input of the and-gate 114 via a polarity inverter 140.

Figure 3:
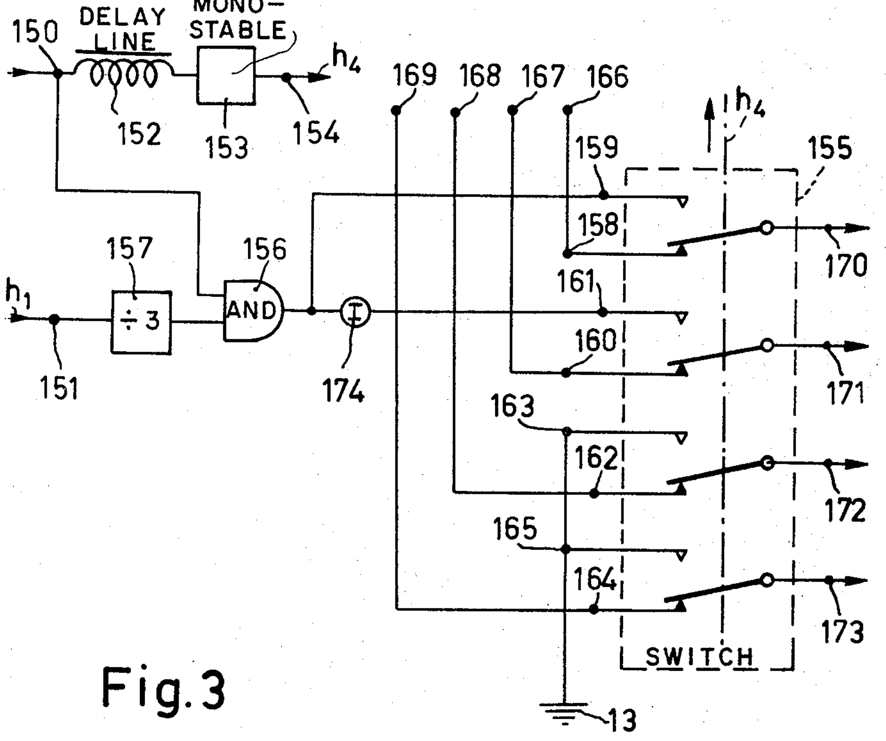
FIG. 3 is a block diagram of a circuit co-operating with the arrangements shown in FIGS. 1 and 2 for allowing a receiver to check the correct phase of the local oscillator which controls the demodulator stage of said receiver.

The arrangement shown in FIG. 3 comprises two input terminals 150 and 151. The terminal 150 receives the line scanning synchronizing signal and the terminal 151 is connected to the terminal 141, at which the signal h1 is available. The terminal 150 is connected to the input of a monostable circuit 153 via a small delay line 152, which introduces a delay of the order of 1 $\mu$sec, for instance. The monostable circuit 153 provides at its output terminal 154 a pulse of a duration which may be equal to about 1 $\mu$sec. This clock signal is designated by h4; it actuates a high-speed four pole switch 155. The terminal 150 is otherwise directly connected to one of the inputs of the and-gate 156 having two inputs. The input terminal 151 of the arrangement is connected to the input of a frequency divider 157, which divides by three the frequency of the clock signal h1 and the output of the frequency divider 157 is connected to the second input of the and-gate 156.

The high-speed four pole switch 155 is provided with four input terminals (break positions), 158, 160, 162 and 164, which are connected to output terminals 170, 171, 172 and 173 respectively, when the switch 155 is not actuated by the signal h4. When the signal h4 actuates the high-speed switch 155, the output terminals 170, 171, 172 and 173 are connected to "make" input terminals 159, 161, 163 and 165 respectively. The "break" input terminals 158, 160, 162 and 164 are connected to input terminals 166, 167, 168 and 169 respectively of the coding arrangement (not shown), each of these terminals serving for conveying to a modulation circuit (not shown) instructions corresponding respectively to the transmission of information represented by the letters A, B, C and D. The output terminals 170, 171, 172 and 173 are connected to the appropriate inputs of the modulation circuit (not shown).

The output of the and-gate 156 is directly connected to the input terminal 159 of the switch 155 and through a polarity inverter 174 to the input terminal 161. Therefore, the voltages applied to the terminals 159 and 161 are square-wave voltages of opposite phase. The input terminals 163 and 165 are directly connected to earth at 13 of the arrangement. When the quadripolar switch 155 is not energized, the instructions emanating from the coder are directly transferred to the modulation stage; when the quadripolar switch 155 is actuated by the signal h4, the circuit applies to the terminals 170 and 171 alternately signals each having a duration of 3 elementary unit times $t$, which mean, for the circuits of a receiver adapted to receive pulsatory signals of the non-return to zero code, consecutive series of three A and three B, when the phase of the local oscillator controlling the demodulator is correct. If the phase of this local oscillator is not correct, the reception of series of 3C or 3D, or even series of 3C and series of 3D each has a defined significance with respect to the correction of the phase, for example, advance by $\pi/2$, retard by $\pi/2$, invert the reference phase.

The operations for the establishment of priority in encoding and transmission, of alteration of the coding of a sampling already performed at the termination of encoding and transmission, of inhibiting the performance of sampling at the end of the transmission during the transmission of a code word having 2 or 3 digits, etc. are carried out by the arrangement of the circuits shown in FIGS. 1 and 2.

The logical relations, which the operation of these two circuit arrangements satisfy, are indicated hereinbelow:

1.1: absolute value of $\Delta\ 1_t > k$, abs. value of $\Delta\ C_t \leftrightarrows S = 1$
1.2: abs. value $\Delta\ 1_t < k$, abs. value $\Delta\ C_t \leftrightarrows S = 0$
2.1: abs. value $\Delta\ 1_{t+\tau} <$ ND40 $\leftrightarrows$ open 31, close 32
2.2: abs. value $\Delta\ 1_{t+\tau} >$ ND40 $\leftrightarrows$ close 31, open 32
3.1: abs. value $UL_{t+2\tau}\ UL_{t+\tau} >$ND40 $\leftrightarrows$ make $S = 1$, set to zero D2, D3, D4, D'6, D'7, D'8
4.1: abs. value $UL_{t+3\tau} - UL_{t+2\tau} >$ ND40 $\leftrightarrows S = 1$
5.1: $S = 1$ and ND15 < abs. value of $\Delta\ L_{t+\tau} <$ ND40 and abs. value of $\Delta\ L_t <$ ND15 set to zero D2, D3, D4, D'6, D'7, D'8
6.1: $S = 0 \leftrightarrows$ actuate 132
6.2: $S = 1$ and output 132 and 139 = 0 $\leftrightarrows$ h2 = h1
6,3: $S = 0$ and outputs 132 and 139 = 0 $\leftrightarrows$ h3 = h1
6.4: $S = 1$ and (output D2 or D'6 = 1) $\rightarrow$ actuate 138
6.5: $S = 1$ and (output D4 or D'8 = 1) $\rightarrow$ actuate 132.

The relations 1.1 and 1.2 correspond to the comparison of the relative amplitudes of the signals Δ L and Δ C at the instant $t$, performed by the difference amplifier 86, the output of which is connected to one of the three inputs of the or-gate 54.

The relations 2.1 and 2.2 correspond to the performance of the coding sampling at the output of the difference amplifier 21, when the code word contains at the most two digits and at the output of the difference amplifier 20, when the brightness code word has three digits. (NR60). This results also in that two consecutive Δ L of a total value of more than 40 percent are replaced by a single transition of a representative level of 60 percent.

The relation 3.1 corresponds to the preparation of a coding of a representative level of 60 percent, which involves the use of a word of three digits. A word of two digits, the coding of which begins at the instant of sampling is transformed into a word of one digit corresponding to a very small variation. The action on the circuitry is started from the output of the difference amplifier 41 and permits coding a word of three digits from the next sampling as the signal available at the tapping 14 of the delay line 12 arrives at the level of the tapping 15.

The relation 4.1 corresponds to the suppression of the performance of the coding sampling of the chrominance signal in the presence of a great brightness transition appearing at the input terminal 10 of the delay line 12. The said suppression results from the appearance of a signal 1 at the output of the difference amplifier 39.

The relation 5.1 permits transmitting, in the frame of the relation 1.1, with a maximum precision a variation corresponding to a representative level of 24 percent by replacing the coding with two digits of a representative level of 8 percent by the 1-digit coding of a representative level of 2 percent. This is performed by setting to zero the outputs D2, D3, D4, D'6, D'7, D'8 of the brightness quantising circuit 52, when a signal "1" appears at the outputs of the difference amplifiers 47 and 45, and a signal "0" appears at the output of the difference amplifier 43; the and-gate 57 passes a signal "1" to the input of the or-gate 55, which starts the bistable circuit 61, which produces the zero-setting of the terminal 63 with the aid of the inverter 62.

The relation 6.1 means that in the presence of a chrominance sampling requiring a word of three digits for coding and transmission the coding samplings carried out with the aid of the high-speed switch 67 do not take place during the two next instants of information sampling. When the terminal 125, to which the signal S is supplied, is at zero, the monostable circuit 132 is started via the inverter 127 and the or-gate 128 so that h2 and h'2 are suppressed at the instants $t + \tau$ and $t + 2\tau$.

The relation 6.2 corresponds to the performance of a chrominance sampling for coding and transmission with the aid of the high speed switch 67 controlled by the clock signal h2: the monostable circuits 132 and 139 being in the rest position and the signal $S = 1$ being available at terminal 117, the clock signal h1 is transmitted by the and-gate 114 and the and-gate 115 so that directly the signal h2 is generated, and by means of the monostable circuit 120 the signal h'2 is produced.

The relation 6.3 corresponds to the performance of a chrominance sampling for coding and transmission with the aid of the high-speed switch 87, controlled by the clock signal h3: when the monostable circuits 132 and 139 are in the rest position and the signal $S = 0$ is available at terminal 17, the clock signal h1 is transmitted by the and-gate 114 and the and-gate 116, so that directly the signal h3 is directly generated, whereas via the monostable circuit 123 the signal h'3 is produced.

The relation 6.4 corresponds to the inhibition of a coding sampling at the instant $t + \tau$ by the transmission of a code word of two digits for brightness: when a signal "1" is present at one of the outputs D2 or D'6 of the brightness quantising circuit 52 (in the case of a representative level of 8 percent, and a word of two digits), it is applied to one of the terminals 136 or 137 (according as D2 or D'6 is concerned) and to one of the inputs of the or-gate 138, which transfers it to one of the inputs of the and-gate 135. The second input of the and-gate 135 has already the signal $S = 1$, so that the monostable circuit 139 is started and transmits during a time equal to a pulse "1" to the input of the inverter 140, which transforms this pulse into "0" at one of the inputs of the and-gate 114: the signals h2 and h'2 are thus suppressed during the next sampling time at the instant $t + \tau$ .

The relation 6.5 corresponds to the inhibition of a coding sampling at the instants $t + \tau$ and $t + 2\ \tau$ in the transmission of a code word of three digits for brightness in the case of a signal $S = 1$ at terminal 125 and a signal "1" at one of the terminals 129 and 130, the monostable circuit 132 is started across the and-gate 126, the or-gate 131 and the or-gate 128.

In order to apply the selection relations the high-speed switches ensuring the information sampling are controlled by the clock signal *h*, which slightly leads with respect to h1, h2 and h3 so that the communications are performed before the coding sampling takes place. The delay line 113 and the delays of operation of the and-gates 115 and 116 provide the required time shifts.

The table shown in FIG. 4 shows the voltage distribution among the outputs connected to the coder(not shown), of the brightness and chrominance quantising circuits as a function of the difference signal to be transmitted for brightness or chrominance and of the required representative level.

By means of the signals "1" and "0" at said outputs it is easy to obtain, in a coder, the corresponding digital coding.

At the receiver end the receiving set need not interpret nor make a choice as at the transmitter end: the maintenance and the check of the synchronism of the local oscillator controlling the demodulator being left out of consideration, the receiver follows accurately the incoming indications and in this respect the reception is very simple, since the more complicated operations are performed at the transmitter end.

A receiver comprises therefore, apart from a conventional high-frequency portion and a video amplifier of short rise time,

- a synchronous detector,
- a high-frequency generator synchronized and cooperating with the synchronous detector,
- a discriminator for transitions from one digit to the other,
- a clock pulse generator synchronized by said discriminator,
- a series-parallel transformer restoring the words by means of the symbols (digits) transmitted,
- a decoding matrix providing separately Δ L and Δ C,
- two integrators providing respectively the signals L and C,
- a device for assessing during the line fly-back whether the phase of the local oscillator is correct and for proceeding to restoration of the correct phase by means of the detected words at the instant of the transmission of the series AAA, BBB, AAA, BBB, etc. This resetting to the correct phase may be performed, for example, by the application of short voltage pulses + Δ U or at least Δ U to a varactor diode, included in the circuit of the local oscillator controlling the synchronous detector.

The further elements of the receiver may be conventional parts; however, the brightness and chrominance integrators have to be reset to zero at the end of each line and the direct-voltage component has to be restored. The integrating circuits of the receiver have to be identical to those used in the transmitter or at least they should have the same time constant. This resetting to zero is performed automatically during the line fly-back when the time constant of the integrators is not too long (of the order of 3 to 5 $\mu$sec, for instance). If resetting to zero is performed at the transmitter end by the use of high-speed switches, the same arrangement has to be used in the corresponding receivers.

The representative levels used (quantised, transmitted transitions) and the decision levels of the quantising circuits chosen in the embodiment described are only given by way of example, as well as the code and the structure of the code words employed.

The use of words of variable length permits of employing numerous variants in coding and in the criteria for the choice of the conditions of transmission. It may be imagined to use words of lengths up to four or five characters, which provides a large number of potential combinations.

I claim:

1. A circuit for transmission of first and second amplitude varying signals in a given bandwidth, said circuit comprising means for simultaneously sampling and quantizing said signals in one to n sampling periods in accordance with the amplitude variations and the time required for the transmission of corresponding code words, said sampling means comprising a delay line having an input adapted to receive said first signal and outputs having delay times equal to one to *n* times the information sampling period respectively, a first plurality of difference amplifiers, each of said amplifiers having a first signal input coupled to said delay line outputs respectively, a second reference signal input adapted to receive a reference signal respectively, and an output; a high speed sampling switch having a plurality of poles coupled to said difference amplifier outputs respectively; a plurality of full wave rectifiers coupled to said poles respectively; a second plurality of difference amplifiers each having a first input coupled to said rectifiers respectively, a second input adapted to receive a reference signal, and an output; a first signal quantizer coupled to said second amplifier outputs; first and second signal sampling switches each having outputs, a second plurality of full wave rectifiers coupled to said first and second sampling switches respectively; a separate difference amplifier having two inputs coupled to said second plurality of rectifiers, and an output; an OR gate having an input coupled to said separate amplifier output; and a bistable circuit coupled to said OR gate for producing an inhibit signal; and pulse delta modulation means coupled to said sampling and quantizing means for transmitting the code word of the signal that has the greatest amplitude variation during a simultaneous sampling using variable length code words.

2. A circuit as claimed in claim 1 wherein said sampling means samples at a constant repetition frequency.

3. A circuit as claimed in claim 1 wherein said transmitting means transmits very small variations of said first signal in a one digit code word, small and mean variations of said first signal in a two digit code words, and large variations of said first signal and small, mean, and large variations of said second signal in three digit code words.

4. A circuit as claimed in claim 1 wherein said code words comprise quadrisymbolic elements.

5. A circuit as claimed in claim 1 wherein said transmitting means transmits small and mean variations of said first signal in two digit code words, large variations of said first signal in three digit code words, said three digit words being advanced by an elementary time duration with respect to the sampling of small and mean variations represented by code words of two digits.

6. A circuit as claimed in claim 1 wherein said first signal quantizer further comprises a plurality of outputs adapted to be coupled to an encoder, and a plurality of switches coupled to said outputs respectively and ground, and an input means coupled to receive a signal for actuating those of said switches that are coupled to outputs that supply encoded words corresponding to both positive and negative variations.

7. A circuit as claimed in claim 1 wherein said sampling and quantizing means further comprises two monostable circuits having operating times equal to one and two sampling periods respectively, an AND gate having at least two inputs coupled to said monostable circuits respectively and an output coupled to said sampling switches.

8. A circuit as claimed in claim 1 further comprising a four pole switch having four make inputs, two being coupled to a square wave source of opposite base and two being coupled to ground; four break inputs coupled to a coding circuit; and four outputs coupled to a modulator.

9. A circuit as claimed in claim 1 wherein said first and second signals comprise television luminance and chrominance signals respectively.

* * * * *